(12) United States Patent
Mitsunaga et al.

(10) Patent No.: US 12,009,669 B2
(45) Date of Patent: Jun. 11, 2024

(54) POWER FEEDING SYSTEM AND POWER MANAGEMENT DEVICE

(71) Applicant: TDK CORPORATION, Tokyo (JP)

(72) Inventors: Takuma Mitsunaga, Tokyo (JP); Katsuo Naoi, Tokyo (JP); Shingo Suzuki, Tokyo (JP); Hisakazu Uto, Tokyo (JP); Masao Ichi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 122 days.

(21) Appl. No.: 17/640,493

(22) PCT Filed: Mar. 25, 2020

(86) PCT No.: PCT/JP2020/013410
§ 371 (c)(1),
(2) Date: Dec. 21, 2022

(87) PCT Pub. No.: WO2021/192107
PCT Pub. Date: Sep. 30, 2021

(65) Prior Publication Data
US 2023/0155391 A1      May 18, 2023

(51) Int. Cl.
*H02J 3/46* (2006.01)
*H02J 3/32* (2006.01)
(Continued)

(52) U.S. Cl.
CPC ....... *H02J 3/46* (2013.01); *H02J 3/32* (2013.01); *H02J 3/381* (2013.01); *H02J 7/35* (2013.01);
(Continued)

(58) Field of Classification Search
CPC ........ H02J 3/46; H02J 3/32; H02J 3/38; H02J 3/381; H02J 7/35; H02J 2207/20; H02J 2300/20
See application file for complete search history.

(56) References Cited

U.S. PATENT DOCUMENTS

2021/0066929 A1    3/2021  Suzuki et al.

FOREIGN PATENT DOCUMENTS

| JP | H06-266458 A | 9/1994 |
| WO | 2012/057032 A1 | 5/2012 |
| WO | 2019/145997 A1 | 8/2019 |

OTHER PUBLICATIONS

Jul. 7, 2020 Search Report issued in International Patent Application No. PCT/JP2020/013410.

(Continued)

*Primary Examiner* — Robert L Deberadinis
(74) *Attorney, Agent, or Firm* — Oliff PLC (57) ABSTRACT

A power feeding system includes a direct current (DC) bus for supplying DC power, a renewable energy power generation device connected to the DC bus, a first converter connected to the DC bus and converting a bus voltage supplied to the DC bus into a load voltage supplied to a load device, a storage battery, a second converter provided between the storage battery and the DC bus and capable of bidirectionally converting the bus voltage and a battery voltage of the storage battery, and a power management device controlling the second converter to charge and discharge the storage battery. The power management device controls the second converter to change the bus voltage based on difference power obtained by subtracting load power supplied to the load device from supply power supplied to the DC bus, the supply power including generated power generated by the renewable energy power generation device.

8 Claims, 5 Drawing Sheets

(51) Int. Cl.
*H02J 3/38* (2006.01)
*H02J 7/35* (2006.01)

(52) U.S. Cl.
CPC ....... *H02J 2207/20* (2020.01); *H02J 2300/20* (2020.01)

(56) References Cited

OTHER PUBLICATIONS

Sep. 22, 2022 International Preliminary Report on Patentability issued in International Patent Application No. PCT/JP2020/013410.

POWER FEEDING SYSTEM AND POWER MANAGEMENT DEVICE

TECHNICAL FIELD

The present disclosure relates to a power feeding system and a power management device.

BACKGROUND ART

In recent years, electric power generation facilities using renewable energy such as wind power and solar power have been introduced. In particular, there is a strong need for power feeding systems that can contribute to the realization of a low-carbon society while improving economic efficiency in areas where power system infrastructure is not well established, such as isolated areas and depopulated areas. Even in regions where power system infrastructure is already in place, expectations are increasing for power feeding systems that stably and continuously supply electric power to a load device when the power system is shut down due to natural disasters or the like.

For example, Patent Literature 1 describes a power feeding system including a photovoltaic power generation device and a rechargeable storage battery. In this power feeding system, electric power is supplied from the photovoltaic power generation device to a load device, and the storage battery is charged and discharged according to the difference between the amount of electric power generated by the photovoltaic power generation device and the load power.

CITATION LIST

Patent Literature

Patent Literature 1: WO 2012/057032 A

SUMMARY OF INVENTION

Technical Problem

In the power feeding system described in Patent Literature 1, the photovoltaic power generation device is connected to a direct current (DC) bus via a DC/DC converter, and is controlled so as to output appropriate electric power by the DC/DC converter. In this power feeding system, the storage battery is connected to the DC bus via a DC/DC converter. Since two DC/DC converters are interposed between the photovoltaic power generation device and the storage battery, the conversion efficiency may decrease when electric power is supplied from the photovoltaic power generation device to the storage battery.

The present disclosure describes a power feeding system and a power management device capable of improving conversion efficiency while performing power generation control of a renewable energy power generation device.

Solution to Problem

A power feeding system according to one aspect of the present disclosure includes: a DC bus for supplying DC power; a renewable energy power generation device connected to the DC bus; a first converter that is connected to the DC bus and converts a bus voltage supplied to the DC bus into a load voltage supplied to a load device; a storage battery; a second converter provided between the storage battery and the DC bus and capable of bidirectionally converting between the bus voltage and a battery voltage of the storage battery; and a power management device that controls the second converter to charge and discharge the storage battery. The power management device controls the second converter so as to change the bus voltage based on difference power obtained by subtracting load power supplied to the load device from supply power supplied to the DC bus, the supply power including generated power generated by the renewable energy power generation device.

In this power feeding system, the renewable energy power generation device is connected to the DC bus, and the storage battery is connected to the DC bus via the second converter. In this manner, since the renewable energy power generation device is connected to the DC bus without passing through any converter, it is possible to improve the conversion efficiency compared with a configuration in which the renewable energy power generation device is connected to the DC bus via a converter. The bus voltage is changed based on the difference power obtained by subtracting the load power from the supply power including the generated power generated by the renewable energy power generation device. Since the generated power of the renewable energy power generation device is changed when the bus voltage is changed, it is possible to perform the power generation control of the renewable energy power generation device. As a result, it is possible to improve the conversion efficiency while performing the power generation control of the renewable energy power generation device.

The power management device may cause the second converter to change the bus voltage in accordance with a magnitude relationship between the difference power and maximum electric power that can be received by the second converter. For example, when the difference power is smaller than the maximum electric power, the second converter can be caused to change the bus voltage so as to increase the generated power. On the other hand, when the difference power is larger than the maximum electric power, the second converter can be caused to change the bus voltage so as to decrease the generated power. With this configuration, the generated power of the renewable energy power generation device can be optimized.

The power management device may cause the second converter to change the bus voltage so as to increase the generated power when the difference power is smaller than the maximum electric power. In this case, more generated power can be obtained. Therefore, the power generation efficiency of the renewable energy power generation device can be improved.

The power management device may cause the second converter to change the bus voltage so as to decrease the generated power when the difference power is larger than the maximum electric power. In this case, the difference power can be suppressed to the maximum electric power or less. Therefore, it is possible to prevent excessive electric power from being supplied to the second converter, and it is possible to reduce the possibility of failure of the second converter.

A power management device according to another aspect of the present disclosure includes: a first acquisition unit that acquires difference power obtained by subtracting load power supplied to a load device connected to a DC bus via a first converter from supply power supplied to the DC bus, the supply power including generated power generated by a renewable energy power generation device connected to the DC bus; and a control unit that controls a second converter provided between the DC bus and a storage battery to change a bus voltage supplied to the DC bus based on the difference power. The second converter is capable of bidirectionally converting between the bus voltage and a battery voltage of the storage battery.

In a power feeding system to which this power management device is applied, the renewable energy power generation device is connected to the DC bus, and the storage battery is connected to the DC bus via the second converter. In this manner, since the renewable energy power generation device is connected to the DC bus without passing through any converter, it is possible to improve the conversion efficiency compared with a configuration in which the renewable energy power generation device is connected to the DC bus via a converter. In such a power feeding system, the power management device changes the bus voltage based on the difference power obtained by subtracting the load power from the supply power including the generated power generated by the renewable energy power generation device connected to the DC bus. Since the generated power of the renewable energy power generation device is changed when the bus voltage is changed, it is possible to perform the power generation control of the renewable energy power generation device. As a result, it is possible to improve the conversion efficiency and perform the power generation control of the renewable energy power generation device.

The power management device may further include a second acquisition unit that acquires maximum electric power that can be received by the second converter. The control unit may cause the second converter to change the bus voltage in accordance with a magnitude relationship between the difference power and the maximum electric power. For example, when the difference power is smaller than the maximum electric power, the second converter can be caused to change the bus voltage so as to increase the generated power. On the other hand, when the difference power is larger than the maximum electric power, the second converter can be caused to change the bus voltage so as to decrease the generated power. With this configuration, the generated power of the renewable energy power generation device can be optimized.

The control unit may cause the second converter to change the bus voltage so as to increase the generated power when the difference power is smaller than the maximum electric power. In this case, more generated power can be obtained. Therefore, the power generation efficiency of the renewable energy power generation device can be improved.

The control unit may cause the second converter to change the bus voltage so as to decrease the generated power when the difference power is larger than the maximum electric power. In this case, the difference power can be suppressed to the maximum electric power or less. Therefore, it is possible to prevent excessive electric power from being supplied to the second converter, and it is possible to reduce the possibility of failure of the second converter.

Advantageous Effects of Invention

According to each aspect and each embodiment of the present disclosure, it is possible to improve conversion efficiency while performing power generation control of the renewable energy power generation device.

DESCRIPTION OF EMBODIMENTS

In the following, some embodiments of the present disclosure will be described with reference to the drawings. It should be noted that in the description of the drawings, the same components are designated with the same reference signs, and the redundant description is omitted.

Figure 1:
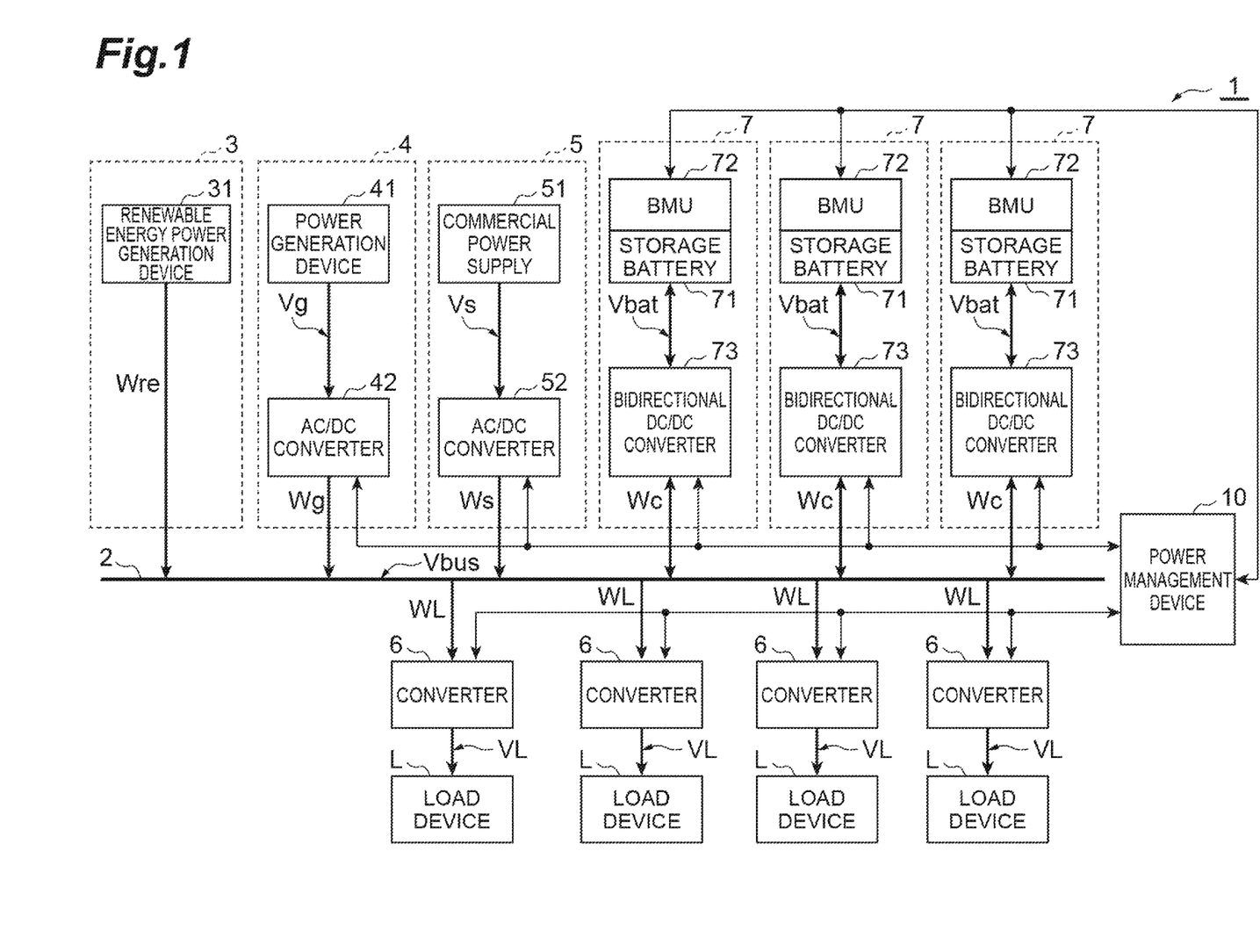
FIG. 1 is a configuration diagram schematically showing a power feeding system according to an embodiment.

FIG. 1 is a configuration diagram schematically showing a power feeding system according to an embodiment. A power feeding system 1 shown in FIG. 1 is a system that supplies load power WL (load voltage VL) to load devices L. In the present embodiment, the power feeding system 1 is a direct current (DC) power feeding system. The load device L may be a DC load device that operates with a DC voltage or an alternating current (AC) load device that operates with an AC voltage. Examples of the DC load devices include a light emission diode (LED) illuminators, DC fans, and personal computers. Examples of AC load devices include washing machines, refrigerators, and air conditioners. The power feeding system 1 includes a DC bus 2, one or more power supply devices 3, one or more auxiliary power supply devices 4, an auxiliary power supply device 5, one or more converters 6 (first converters), one or more power storage devices 7, and a power management device 10.

The DC bus 2 is a bus that functions as a bus line for performing DC power supply for supplying DC electric power. The DC bus 2 is laid across the installation locations of the power supply device 3, the auxiliary power supply device 4, the auxiliary power supply device 5, the power storage device 7, and the load device L. A bus voltage Vbus is supplied to the DC bus 2. The bus voltage Vbus is a high DC voltage. The bus voltage Vbus is changed within a predetermined voltage range by a bidirectional DC/DC converter 73 (second converter) to be described later. The voltage range of the bus voltage Vbus is set to be included in the range of the input voltage of the converter 6. The bus voltage Vbus is changed within a voltage range of DC250V or more and DC450V or less, for example.

The power supply device 3 is a device that supplies electric power to the DC bus 2. In the present embodiment, the power feeding system 1 includes one power supply device 3. The number of power supply devices 3 is not limited to one, and may be appropriately changed as necessary. The power supply device 3 includes a renewable energy power generation device 31.

The renewable energy power generation device 31 is a device that generates DC generated power Wre. Examples of the renewable energy power generation device 31 include a photovoltaic power generation device, a wind power generation device, and a fuel cell. The renewable energy power generation device 31 is directly connected to the DC bus 2 without interposing a power conditioner. The renewable energy power generation device 31 generates generated power Wre having a power value corresponding to the bus voltage Vbus, and supplies the generated power Wre to the DC bus 2.

Figure 2:
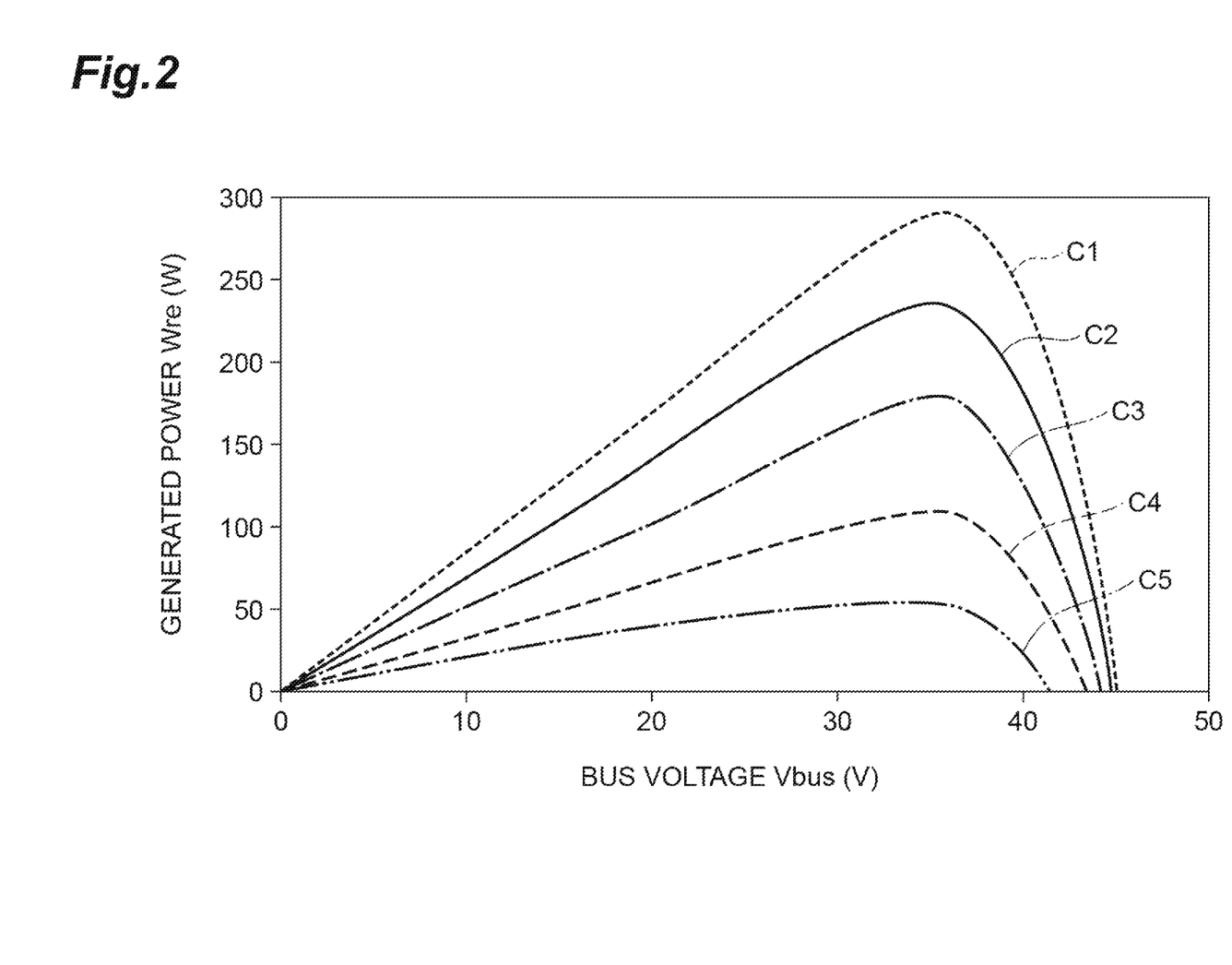
FIG. 2 is a diagram showing power generation characteristics of the renewable energy power generation device shown in FIG. 1.

FIG. 2 is a diagram showing power generation characteristics of the renewable energy power generation device shown in FIG. 1. A photovoltaic power generation device is used as the renewable energy power generation device 31. The characteristics C1 to C5 indicate the relationship between the generated power Wre and the bus voltage Vbus at different irradiances. Irradiances decrease in the order of the characteristic C1, the characteristic C2, the characteristic C3, the characteristic C4, and the characteristic C5. As shown in FIG. 2, the power value of the generated power Wre can be changed in accordance with the voltage value of the bus voltage Vbus.

The auxiliary power supply device 4 is a device that supplies electric power to the DC bus 2. In the present embodiment, the power feeding system 1 includes one auxiliary power supply device 4. The number of auxiliary power supply devices 4 is not limited to one, and may be appropriately changed as necessary. The auxiliary power supply device 4 includes a power generation device 41 and an AC/DC converter 42.

The power generation device 41 is a device that generates AC generated power Wg. An example of the power generation device 41 is a diesel generator. The power generation device 41 is connected to the DC bus 2 via the AC/DC converter 42. For example, the power generation device 41 is activated and deactivated by an operation (manual operation) by the operator. Activation and deactivation of the power generation device 41 may be controlled by the power management device 10. For example, the power generation device 41 is activated when a large amount of electric power is temporarily required in order to charge a storage battery 71 described later. In this case, the power generation device 41 is configured to be capable of generating electric power with which the storage battery 71 can be sufficiently charged while supplying the load device L with the load power WL. In the operating state, the power generation device 41 generates a power generation voltage Vg having a predetermined voltage value, and outputs the generated power Wg corresponding to the power generation voltage Vg. The power generation voltage Vg is an AC voltage.

The AC/DC converter 42 is connected to the DC bus 2, and is a device that converts the power generation voltage Vg into the bus voltage Vbus. The AC/DC converter 42 operates with, for example, a DC voltage internally generated based on the power generation voltage Vg. The AC/DC converter 42 controls the generated power Wg by controlling the power generation operation of the power generation device 41 based on a command from the power management device 10. The AC/DC converter 42 converts the power generation voltage Vg into the bus voltage Vbus based on a command from the power management device 10, and supplies the bus voltage Vbus to the DC bus 2. The AC/DC converter 42 has a power measurement function of measuring the generated power Wg supplied from the power generation device 41 to the DC bus 2. The AC/DC converter 42 periodically measures the generated power Wg, for example. The AC/DC converter 42 transmits the measured value of the generated power Wg to the power management device 10.

The auxiliary power supply device 5 is a device that supplies electric power to the DC bus 2. The auxiliary power supply device 5 includes a commercial power supply 51 and an AC/DC converter 52. The commercial power supply 51 supplies system power Ws including a system voltage Vs of a predetermined voltage value. The system voltage Vs is an AC voltage. The commercial power supply 51 is connected to the DC bus 2 via the AC/DC converter 52.

The AC/DC converter 52 is connected to the DC bus 2, and is a device that converts the system voltage Vs into the bus voltage Vbus. The system voltage Vs is an AC voltage. The AC/DC converter 52 operates with, for example, a DC voltage internally generated based on the system voltage Vs. The AC/DC converter 52 converts the system voltage Vs into the bus voltage Vbus based on a command from the power management device 10, and supplies the bus voltage Vbus to the DC bus 2. The AC/DC converter 52 has a power measurement function of measuring the system power Ws supplied from the commercial power supply 51 to the DC bus 2. The AC/DC converter 52 periodically measures the system power Ws, for example. The AC/DC converter 52 transmits the measured value of the system power Ws to the power management device 10.

Since the auxiliary power supply device 4 and the auxiliary power supply device 5 can stably supply electric power, they are controlled so as to supply electric power when the electric power of the entire power feeding system 1 is insufficient.

The converter 6 is connected to the DC bus 2, and is a device that converts the bus voltage Vbus into a load voltage VL. The load voltage VL is a voltage supplied to the load device L. The load device L is connected to the DC bus 2 via the converter 6. The converter 6 operates with, for example, a DC voltage internally generated based on the bus voltage Vbus. In the present embodiment, the power feeding system 1 includes four converters 6. The number of converters 6 is not limited to four, and may be changed in accordance with the number of load devices L.

When receiving a start command from the power management device 10, the converter 6 converts the bus voltage Vbus into the load voltage VL, and supplies the load voltage VL (load power WL) to the load device L. When the load device L is a DC load device, the load voltage VL is a DC voltage, and the converter 6 is a DC/DC converter. When the load device L is an AC load device, the load voltage VL is an AC voltage, and the converter 6 is a DC/AC converter. When receiving a stop command from the power management device 10, the converter 6 stops supplying of the load voltage VL.

The converter 6 has a current limiting function of limiting a load current supplied from the DC bus 2 to the load device L to an upper limit current value. The upper limit current value is set by the power management device 10. The converter 6 has a power measurement function of measuring the load power WL supplied from the DC bus 2 to the load device L based on the load voltage VL and the load current. The converter 6 periodically measures the load power WL, for example. The converter 6 transmits the measured value of the load power WL to the power management device 10.

The power storage device 7 is a device for storing surplus electric power generated in the power feeding system 1 and supplying deficient electric power generated in the power feeding system 1. When the difference power obtained by subtracting the sum of the load power WL from the sum of the supply power is larger than 0, surplus electric power equal to the magnitude (power value) of the difference power occurs. The supply power is electric power supplied to the DC bus 2. In the present embodiment, the supply power is the generated power Wre, the generated power Wg, and the system power Ws. Power Wc obtained by equally dividing surplus electric power by the number of power storage devices 7 is supplied from the DC bus 2 to each power storage device 7. When the difference power is less than 0, deficient electric power equal to the magnitude of the difference power occurs. From each power storage device 7, power Wc obtained by equally dividing the deficient electric power by the number of power storage devices 7 is released to the DC bus 2.

The number of power storage devices 7 is not limited to three, and may be appropriately changed as necessary. Each of the power storage devices 7 includes the storage battery 71, a battery management unit (BMU) 72, and the bidirectional DC/DC converter 73.

The storage battery 71 is a chargeable and dischargeable device. The storage battery 71 is connected to the DC bus 2 via the bidirectional DC/DC converter 73. Examples of the storage battery 71 include a lithium ion battery, a sodium-sulfur (NAS) battery, a redox flow battery, a lead acid battery, and a nickel metal hydride battery. In the present embodiment, the storage batteries 71 included in the power storage devices 7 are of the same type and have the same storage capacity. The storage capacity is the maximum amount of electric power that can be stored. The storage batteries 71 included in the power storage devices 7 may be different types of storage batteries and may have different storage capacities. The storage battery 71 includes, for example, a plurality of battery cells.

The BMU 72 is a device that manages the storage battery 71. The BMU 72 has a function of measuring a battery voltage Vbat of the storage battery 71, and a function of calculating a state of charge (SOC) by measuring the current value of the charging and discharging current of the storage battery 71. The BMU 72 transmits the battery information of the storage battery 71 to the power management device 10. The battery information includes the measured value of the battery voltage Vbat, the current value of the charging and discharging current, and the SOC. The battery information may include the temperature of the storage battery 71. The BMU 72 periodically transmits the battery information to the power management device 10.

The bidirectional DC/DC converter 73 is connected to the DC bus 2, and is a device capable of bidirectionally converting between the bus voltage Vbus and the battery voltage Vbat. The bidirectional DC/DC converter 73 is provided between the storage battery 71 and the DC bus 2. The battery voltage Vbat is the voltage of the storage battery 71. As the bidirectional DC/DC converter 73, a known bidirectional DC/DC converter can be used. The bidirectional DC/DC converter 73 operates with, for example, a DC voltage internally generated based on the bus voltage Vbus.

The bidirectional DC/DC converter 73 is controlled by the power management device 10. Specifically, when the bidirectional DC/DC converter 73 receives a charge command from the power management device 10, the bidirectional DC/DC converter 73 converts the bus voltage Vbus into the battery voltage Vbat and causes a charging current to flow from the DC bus 2 to the storage battery 71. Thus, the storage battery 71 is charged. When the bidirectional DC/DC converter 73 receives a discharge command from the power management device 10, the bidirectional DC/DC converter 73 converts the battery voltage Vbat into the bus voltage Vbus and causes a discharging current to flow from the storage battery 71 to the DC bus 2. Thus, the storage battery 71 is discharged. The bidirectional DC/DC converter 73 may charge or discharge the storage battery 71 in a constant-current manner or in a constant-voltage manner.

When the bidirectional DC/DC converter 73 receives a stop command from the power management device 10, the bidirectional DC/DC converter 73 stops the operation and shifts to a sleep state in which the electric power consumption is reduced. When the bidirectional DC/DC converter 73 receives the charge command or the discharge command in the sleep state, the bidirectional DC/DC converter 73 exits from the sleep state and executes the charge process or the discharge process. The bidirectional DC/DC converter 73 has a current limiting function of limiting each current value of the charging current supplied to the storage battery 71 and the discharging current discharged from the storage battery 71 to a maximum current value (for example, 45A) of the storage battery 71 or less.

The bidirectional DC/DC converter 73 has a power measurement function of measuring the power Wc. The bidirectional DC/DC converter 73 periodically measures the power Wc, for example. The bidirectional DC/DC converter 73 transmits the measured value of the power Wc to the power management device 10.

When the bidirectional DC/DC converter 73 receives a voltage adjustment command from the power management device 10, the bidirectional DC/DC converter 73 adjusts the voltage value of the bus voltage Vbus to the target voltage value included in the voltage adjustment command. The maximum electric power that can be received by the bidirectional DC/DC converter 73 is predetermined. The bidirectional DC/DC converter 73 transmits device information including the power value of the maximum electric power (maximum power value) to the power management device 10.

The power management device 10 is a device (controller) that manages the entire power feeding system 1. The power management device 10 is also referred to as an energy management system (EMS). The power management device 10 is communicably connected to the auxiliary power supply device 4, the auxiliary power supply device 5, the converter 6, and the power storage device 7 via a communication line. The communication line may be configured to be wired or wireless. The power management device 10 may perform communication conforming to standards such as RS-232C, RS-485, Controller Area Network (CAN), and Ethernet (registered trademark).

The power management device 10 performs a voltage measurement process of measuring the bus voltage Vbus. The power management device 10 may directly measure the bus voltage Vbus. The power management device 10 may indirectly measure the bus voltage Vbus by the bidirectional DC/DC converter 73 measuring the bus voltage Vbus and transmitting the measured value to the power management device 10.

The power management device 10 transmits a start command and a stop command to each of the AC/DC converter 42, the AC/DC converter 52, the converter 6, and the bidirectional DC/DC converter 73. For example, the power management device 10 causes the converter 6 to supply the load voltage VL by transmitting a start command to the converter 6. The power management device 10 causes the converter 6 to stop supplying the load voltage VL by transmitting a stop command to the converter 6. The same applies to the other converters.

The power management device 10 performs a charge and discharge process of charging and discharging the storage battery 71 by controlling the bidirectional DC/DC converter 73. The power management device 10 performs the charge and discharge process depending on the difference power. When the sum of the supply power is larger than the sum of the load power WL (when the difference power is larger than 0), the power management device 10 transmits the charge command to the bidirectional DC/DC converter 73 and causes the storage battery 71 to store surplus electric power that is the difference power. That is, electric power obtained by equally dividing the surplus electric power by the number of storage batteries 71 is stored in each storage battery 71. When the sum of the supply power is smaller than the sum of the load power WL (when the difference power is smaller than 0), the power management device 10 transmits the discharge command to the bidirectional DC/DC converter 73 and causes the storage battery 71 to discharge the deficient electric power. Electric power obtained by equally dividing the deficient electric power by the number of storage batteries 71 is discharged from each storage battery 71.

The power management device 10 controls the bidirectional DC/DC converter 73 to change the bus voltage Vbus based on the difference power. The power management device 10 causes the bidirectional DC/DC converter 73 to change the bus voltage Vbus by transmitting the voltage adjustment command including the target voltage value of the bus voltage Vbus to the bidirectional DC/DC converter 73. Thus, the maximum power point tracking (MPPT) control and peak-cut control are performed. Details of the MPPT control and the peak-cut control will be described later.

Figure 3:
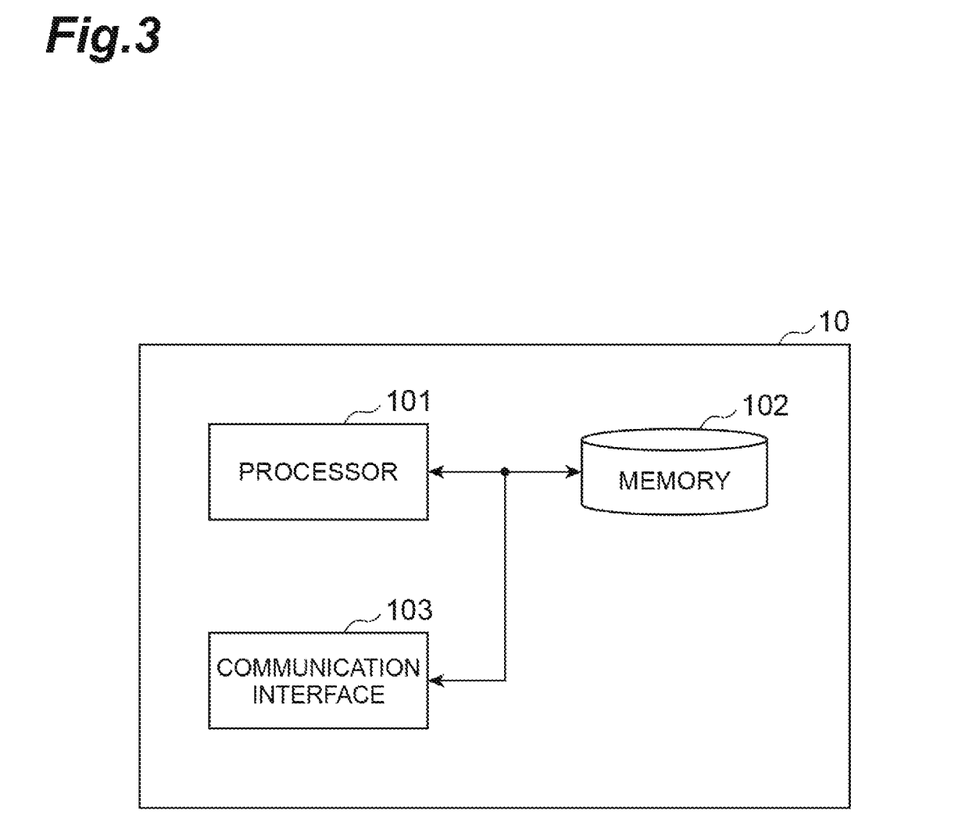
FIG. 3 is a hardware configuration diagram of the power management device shown in FIG. 1.

FIG. 3 is a hardware configuration diagram of the power management device shown in FIG. 1. As shown in FIG. 3, the power management device 10 may be physically configured as a computer including hardware such as one or more processors 101, a memory 102, and a communication interface 103. An example of the processor 101 is a central processing unit (CPU). The memory 102 may include a main storage device and an auxiliary storage device. The main storage device is constituted by a random access memory (RAM), a read only memory (ROM), and the like. Examples of the auxiliary storage device include a semiconductor memory and a hard disk device. The communication interface 103 is a device that transmits/receives data to/from other devices. The communication interface 103 includes, for example, a communication module conforming to a communication standard such as RS-232C, RS-485, or CAN, a network interface card (NIC), or a wireless communication module.

By the processor 101 reading a program stored in the memory 102 to execute the program, each hardware operates under the control of the processor 101 to read and write data from/to the memory 102. Thus, the functional units of the power management device 10 shown in FIG. 4 are implemented.

Figure 4:
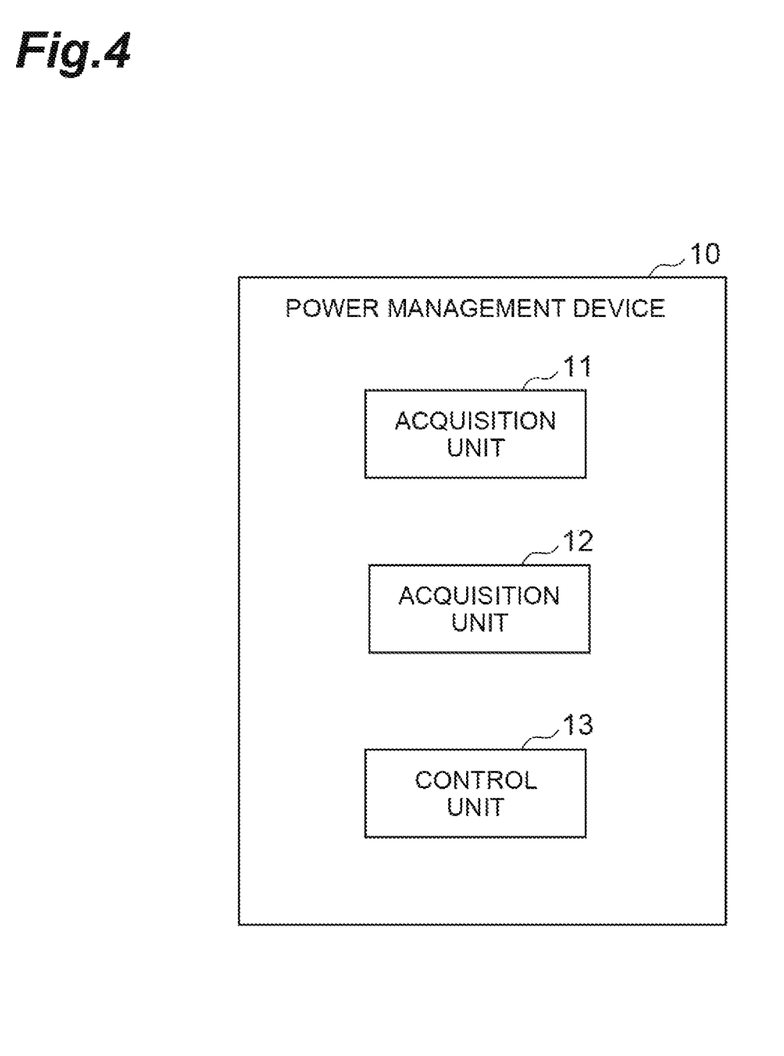
FIG. 4 is a functional block diagram of the power management device shown in FIG. 1.

FIG. 4 is a functional block diagram of the power management device shown in FIG. 1. As shown in FIG. 4, the power management device 10 functionally includes an acquisition unit 11 (first acquisition unit), an acquisition unit 12 (second acquisition unit), and a control unit 13.

The acquisition unit 11 is a functional unit that acquires a power value (difference power value) of difference power. For example, the acquisition unit 11 acquires, from each bidirectional DC/DC converter 73, the measured value of the power Wc between the DC bus 2 and the bidirectional DC/DC converter 73, and sets the sum of the measured values of the power Wc as the difference power value. In the present embodiment, the measured value of the power Wc is acquired from each of the three bidirectional DC/DC converters 73.

The acquisition unit 11 may acquire, as the difference power value, a value obtained by subtracting the sum of the measured values of the load power WL from the sum of the measured values of the supply power. In this case, the acquisition unit 11 acquires the measured value of the generated power Wg from the AC/DC converter 42, acquires the measured value of the system power Ws from the AC/DC converter 52, and acquires the measured value of the load power WL from each converter 6. The acquisition unit 11 calculates the power value of the generated power Wre by multiplying the current value measured by a current sensor (not shown) provided between the renewable energy power generation device 31 and the DC bus 2 by the voltage value of the bus voltage Vbus.

The acquisition unit 12 is a functional unit that acquires a power value (maximum power value) of maximum electric power that can be received by all the bidirectional DC/DC converters 73 in the power feeding system 1. The acquisition unit 12 acquires, for example, device information including the maximum power value from each bidirectional DC/DC converter 73, and sets the sum of the maximum power values of the bidirectional DC/DC converters 73 as the maximum power value that can be received by all the bidirectional DC/DC converters 73 in the power feeding system 1.

When all the bidirectional DC/DC converters 73 have the same maximum electric power, a value obtained by multiplying the maximum power value acquired from one bidirectional DC/DC converter 73 by the number of bidirectional DC/DC converters 73 may be used as the maximum power value that can be received by all the bidirectional DC/DC converters 73 in the power feeding system 1.

The control unit 13 is a functional unit that controls the bidirectional DC/DC converters 73 so as to change the bus voltage Vbus based on the difference power. The control unit 13 causes the bidirectional DC/DC converters 73 to change the bus voltage Vbus in accordance with the magnitude relationship between the difference power and the maximum electric power of the bidirectional DC/DC converters 73. For example, when the difference power is smaller than the maximum electric power, the control unit 13 performs the MPPT control. The MPPT control is control for maximizing the generated power Wre. In other words, when the difference power is smaller than the maximum electric power, the control unit 13 changes the bus voltage Vbus so as to increase the generated power Wre. The control unit 13 performs the MPPT control using, for example, a hill climbing method.

When the difference power is larger than the maximum electric power, the control unit 13 performs peak-off control. The peak-off control is control for suppressing the generated power Wre so that the generated power Wre does not become larger than the maximum electric power of the bidirectional DC/DC converters 73. In other words, when the difference power is larger than the maximum electric power, the control unit 13 changes the bus voltage Vbus so as to decrease the generated power Wre.

Figure 5:
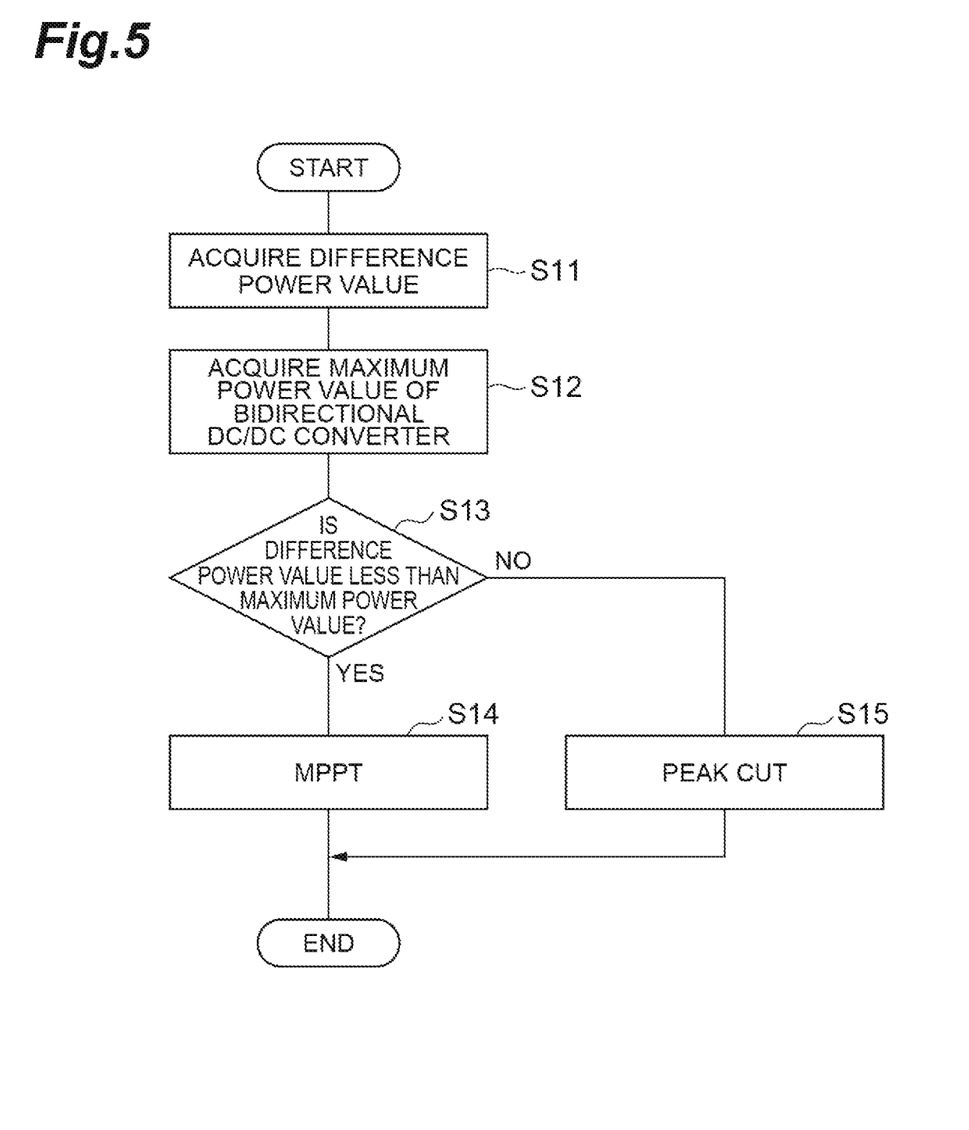
FIG. 5 is a flowchart showing a series of processes of a power management method performed by the power management device shown in FIG. 1.

Next, a power management method performed by the power management device 10 will be described with further reference to FIG. 5. FIG. 5 is a flowchart showing a series of processes of a power management method performed by the power management device shown in FIG. 1. The series of processes in FIG. 5 is repeatedly performed every time a predetermined time (for example, 10 seconds) elapses.

First, the acquisition unit 11 acquires a difference power value (step S11). For example, the acquisition unit 11 receives measured values of the power Wc from the bidirectional DC/DC converters 73 and acquires the sum of the measured values as a difference power value. Then, the acquisition unit 11 outputs the difference power value to the control unit 13.

Subsequently, the acquisition unit 12 acquires the maximum power value that can be received by all the bidirectional DC/DC converters 73 in the power feeding system 1 (step S12). The acquisition unit 12 acquires, for example, the maximum power value from each bidirectional DC/DC converter 73, and sets the sum of these maximum power values as the maximum power value that can be received by all the bidirectional DC/DC converters 73 in the power feeding system 1. Then, the acquisition unit 12 outputs the maximum power value to the control unit 13.

Subsequently, upon receiving the difference power value from the acquisition unit 11 and the maximum power value of the bidirectional DC/DC converters 73 from the acquisition unit 12, the control unit 13 compares the difference power value with the maximum power value to determine whether the difference power is larger or smaller than the maximum electric power of the bidirectional DC/DC converters 73 (step S13). In step S13, when it is determined that the difference power is smaller than the maximum electric power (step S13; YES), the control unit 13 performs the MPPT control (step S14).

Specifically, the control unit 13 causes the bidirectional DC/DC converters 73 to change the bus voltage Vbus so as to increase the difference power. When the difference power is increased by changing the bus voltage Vbus, it is considered that the generated power Wre is increased. Therefore, it can be said that the control unit 13 causes the bidirectional DC/DC converters 73 to change the bus voltage Vbus so as to increase the generated power Wre. The MPPT control is performed not only during the charge process but also during the discharge process.

The control unit 13 causes the bidirectional DC/DC converters 73 to change the bus voltage Vbus using, for example, a hill-climbing method. In this case, the control unit 13 transmits, for example, a voltage adjustment command including a target voltage value obtained by adding a predetermined value to the voltage value of the bus voltage Vbus to each bidirectional DC/DC converter 73. When the difference power increases, the control unit 13 transmits, to each bidirectional DC/DC converter 73, a voltage adjustment command including a target voltage value obtained by further adding the predetermined value to the voltage value of the bus voltage Vbus without changing the sign of the predetermined value. When the difference power decreases, the control unit 13 inverts the sign of the predetermined value and transmits a voltage adjustment command including a target voltage value obtained by adding the predetermined value to the voltage value of the bus voltage Vbus to each bidirectional DC/DC converter 73. Thus, a series of processes of the power management method is completed.

On the other hand, in step S13, when it is determined that the difference power is larger than the maximum electric power of the bidirectional DC/DC converters 73 (step S14; NO), the control unit 13 performs peak-cut control (step S15). Specifically, the control unit 13 causes the bidirectional DC/DC converters 73 to change the bus voltage Vbus so as to decrease the difference power. When the difference power is decreased by changing the bus voltage Vbus, it is considered that the generated power Wre is decreased. Therefore, it can be said that the control unit 13 causes the bidirectional DC/DC converters 73 to change the bus voltage Vbus so as to decrease the generated power Wre.

The control unit 13 transmits, for example, a voltage adjustment command including a target voltage value obtained by reducing the voltage value of the bus voltage Vbus by a predetermined value to each bidirectional DC/DC converter 73. When the difference power is larger than the maximum electric power, the control unit 13 transmits a voltage adjustment command including a target voltage value obtained by further reducing the voltage value of the bus voltage Vbus by the predetermined value to each bidirectional DC/DC converter 73. The control unit 13 repeatedly performs the above-described processing until the difference power becomes lower than the maximum electric power. Thus, a series of processes of the power management method is completed.

In the power feeding system 1 described above, the renewable energy power generation device 31 is connected to the DC bus 2, and the storage battery 71 is connected to the DC bus 2 via the bidirectional DC/DC converter 73. In this way, since the renewable energy power generation device 31 is directly connected to the DC bus 2 without passing through any converter, it is possible to improve the conversion efficiency compared with a configuration in which the renewable energy power generation device 31 is connected to the DC bus 2 via a converter.

For example, assuming that the power conversion efficiency per converter is 90%, in the configuration in which the renewable energy power generation device 31 is connected to the DC bus 2 via the converter, the conversion efficiency of electric power supplied from the renewable energy power generation device 31 to the storage battery 71 is 81%. On the other hand, in the power feeding system 1, the conversion efficiency of electric power supplied from the renewable energy power generation device 31 to the storage battery 71 is 90%. Therefore, the conversion efficiency can be improved by 9%.

In the power management device 10 applied to the power feeding system 1, the bus voltage Vbus is changed based on the difference power obtained by subtracting the load power WL from the supply power including the generated power Wre. When the bus voltage Vbus is changed, the generated power Wre of the renewable energy power generation device 31 is changed, and thus the power generation control of the renewable energy power generation device 31 can be performed. As a result, it is possible to improve the conversion efficiency while performing the power generation control of the renewable energy power generation device 31.

The power management device 10 (control unit 13) causes the bidirectional DC/DC converters 73 to change the bus voltage Vbus in accordance with the magnitude relationship between the difference power and the maximum electric power of the bidirectional DC/DC converters 73. For example, when the difference power is smaller than the maximum electric power, the power management device 10 causes the bidirectional DC/DC converters 73 to change the bus voltage Vbus so as to increase the generated power Wre. As a result, more generated power Wre can be obtained. Therefore, the power generation efficiency of the renewable energy power generation device 31 can be improved. On the other hand, when the difference power is larger than the maximum electric power, the power management device 10 causes the bidirectional DC/DC converters 73 to change the bus voltage Vbus so as to decrease the generated power Wre. As a result, the difference power can be suppressed to the maximum electric power or less. Therefore, it is possible to prevent excessive electric power from being supplied to the bidirectional DC/DC converter 73, and it is possible to reduce the possibility of the bidirectional DC/DC converter 73 failing. As described above, the generated power Wre can be optimized.

The power feeding system and the power management device according to the present disclosure are not limited to the above-described embodiments.

For example, the power feeding system 1 may not include the auxiliary power supply device 5. In this case, the power feeding system 1 is also referred to as an independent DC power feeding system.

The power management device 10 may be configured by one physically or logically coupled device, or may be configured by two or more devices that are physically or logically separated from each other. For example, the power management device 10 may be implemented by a plurality of computers distributed over a network, such as cloud computing.

At least one of the AC/DC converter 42, the AC/DC converter 52, the converter 6, and the bidirectional DC/DC converter 73 may not have the power measurement function. In this case, the power management device 10 may acquire the measured value of each electric power from the measured value of the voltage measured by the voltage sensor and the measured value of the current measured by the current sensor.

In the above-described embodiment, each of the AC/DC converter 42, the AC/DC converter 52, the converter 6, and the bidirectional DC/DC converter 73 operates with a DC voltage generated inside the device. Instead of this configuration, the power feeding system 1 may include a power supply unit, and the power supply unit may generate a DC voltage having a constant voltage value from the bus voltage Vbus of the DC bus 2 and supply the DC voltage (power) to each device.

As the MPPT control, the control unit 13 may cause the bidirectional DC/DC converters 73 to change the bus voltage Vbus so as to increase the power Wc when the measured value of the power Wc acquired from one bidirectional DC/DC converter 73 is smaller than the maximum power value of the bidirectional DC/DC converter 73. Similarly, as the peak-cut control, when the measured value of the power Wc acquired from one bidirectional DC/DC converter 73 is larger than the maximum power value of the bidirectional DC/DC converter 73, the control unit 13 may cause the bidirectional DC/DC converters 73 to change the bus voltage Vbus so as to decrease the power Wc.

REFERENCE SIGNS LIST

1 Power feeding system
2 DC bus
6 Converter (first converter)
10 Power management device
11 Acquisition unit (first acquisition unit)
12 Acquisition unit (second acquisition unit)
13 Control unit
31 Renewable energy power generation device
71 Storage battery
73 Bidirectional DC/DC converter (second converter)
L Load device
Vbat Battery voltage
Vbus Bus voltage
VL Load voltage
Wg Generated power (supply power)
Wre Generated power (supply power)
Ws System power (supply power)
WL Load power

The invention claimed is:

1. A power feeding system comprising:
a direct current (DC) bus for supplying DC power;
a renewable energy power generation device connected to the DC bus;
a first converter connected to the DC bus and configured to convert a bus voltage supplied to the DC bus into a load voltage supplied to a load device;
a storage battery;
a second converter provided between the storage battery and the DC bus and capable of bidirectionally converting between the bus voltage and a battery voltage of the storage battery; and
a power management device configured to control the second converter to charge and discharge the storage battery,
wherein the power management device controls the second converter to change the bus voltage based on difference power obtained by subtracting load power supplied to the load device from supply power supplied to the DC bus, the supply power including generated power generated by the renewable energy power generation device.

2. The power feeding system according to claim 1, wherein the power management device causes the second converter to change the bus voltage in accordance with a magnitude relationship between the difference power and maximum electric power that can be received by the second converter.

3. The power feeding system according to claim 2, wherein the power management device causes the second converter to change the bus voltage so as to increase the generated power when the difference power is smaller than the maximum electric power.

4. The power feeding system according to claim 2, wherein the power management device causes the second converter to change the bus voltage so as to decrease the generated power when the difference power is larger than the maximum electric power.

5. A power management device comprising:
a first acquisition unit configured to acquire difference power obtained by subtracting load power supplied to a load device connected to a direct current (DC) bus via a first converter from supply power supplied to the DC bus, the supply power including generated power generated by a renewable energy power generation device connected to the DC bus; and
a control unit configured to control a second converter provided between the DC bus and a storage battery to change a bus voltage supplied to the DC bus based on the difference power,
wherein the second converter is capable of bidirectionally converting between the bus voltage and a battery voltage of the storage battery.

6. The power management device according to claim 5, further comprising a second acquisition unit configured to acquire maximum electric power of the second converter,
wherein the control unit causes the second converter to change the bus voltage in accordance with a magnitude relationship between the difference power and the maximum electric power.

7. The power management device according to claim 6, wherein the control unit causes the second converter to change the bus voltage so as to increase the generated power when the difference power is smaller than the maximum electric power.

8. The power management device according to claim 6, wherein the control unit causes the second converter to change the bus voltage so as to decrease the generated power when the difference power is larger than the maximum electric power.

* * * * *